US006979417B2

(12) United States Patent
Yang

(10) Patent No.: US 6,979,417 B2
(45) Date of Patent: Dec. 27, 2005

(54) METHOD OF MAKING BIODEGRADABLE NON-POLLUTING PRODUCT

(76) Inventor: Kuo-Chen Yang, No. 20, Lane 163, Chung-Jen St., Hsi Dist., Taichung City (TW)

(*) Notice: Subject to any disclaimer, the term of this patent is extended or adjusted under 35 U.S.C. 154(b) by 257 days.

(21) Appl. No.: 10/649,574

(22) Filed: Aug. 26, 2003

(65) Prior Publication Data

US 2004/0036192 A1  Feb. 26, 2004

Related U.S. Application Data

(63) Continuation-in-part of application No. 09/753,972, filed on Jan. 3, 2001, now abandoned.

(51) Int. Cl.$^7$ .................... B29C 59/00; D04H 3/16; D21B 1/04
(52) U.S. Cl. .................... 264/115; 264/118; 264/122
(58) Field of Search .................... 264/115, 118, 122

(56) References Cited

U.S. PATENT DOCUMENTS 4,882,114 A * 11/1989 Radvan et al. .............. 264/129
5,395,571 A *  3/1995 Symons ....................... 264/42

* cited by examiner

Primary Examiner—Stephen J. Lechert, Jr.
(74) Attorney, Agent, or Firm—The Webb Law Firm

(57) ABSTRACT

A method of making a biodegradable non-polluting product includes grinding an agricultural fibrous material to form a particulate material; preparing a binder by mixing formaldehyde with carboxymethyl cellulose and polyvinylalcohol; mixing the particulate material with a stearate and a sulfate to form a first mixture; adding the binder and water to the first mixture to form a second mixture; and forming the second mixture into the non-polluting product. The fibrous material may be an agricultural fibrous waste material. The products made by the method contain no toxic material.

8 Claims, 3 Drawing Sheets

METHOD OF MAKING BIODEGRADABLE NON-POLLUTING PRODUCT

CROSS-REFERENCE TO RELATED APPLICATION

This application is a continuation-in-part of U.S. patent application Ser. No. 09/753,972 filed by the applicant on Jan. 3, 2001, now abandoned the entire disclosure of which is incorporated herein by reference.

BACKGROUND OF THE INVENTION

1. Field of the Invention

This invention relates to a method of making non-polluting and biodegradable plastic products, such as food containers, bone ash urns, caskets and the like.

2. Description of the Related Art

A conventional casket generally uses a large amount of wood as a main raw material, thereby resulting in a very high product cost and in harm to the environment due to extensive felling of numerous trees.

Moreover, raw materials for making conventional disposable food containers include plastic and paper materials. Problems arise in that the plastic material can not decompose naturally and will produce toxic gases during burning, and that the paper material does not have a good water and oil resistance and entails a relatively high production cost.

It is known in the art to recycle particulate wastes such as wood chips, sawdust, and other ground agricultural wastes by mixing the wastes with a binder and by forming the resulting mixture in a mold. U.S. Pat. No. 4,711,669 discloses a method by admixing a particulate material with a binder system, wherein the binder system is prepared by admixing a polyol comprising a water soluble amylaceous hydrolyzate with a heterocyclic compound comprising the reaction product of glyoxal, urea and formaldehyde, alone, or in further combination with ethylene glycol, with a solvent and with an acid effective to control the rate of cross-linking between the polyol and the heterocyclic compound.

U.S. Pat. No. 3,025,255 discloses an aqueous alkaline adhesive comprising phenol-formaldehyde condensate and polyethylene glycol.

U.S. Pat. No. 4,065,413 discloses a fire resistance wood-based boards by using a thermosetting resin such as phenol formaldehyde as a binder.

U.S. Pat. No. 6,113,729 discloses a method of making lignocellulosic composites by using phenol-formaldehyde resin as a binder.

U.S. Pat. No. 4,479,912 discloses a fiber board composition prepared from lignocellulosic particles, such as softwood or hardwood waste particles by using a phenolic-type resin as a binder.

SUMMARY OF THE INVENTION

An object of the present invention is to provide a method of making a biodegradable and non-polluting product from recycled agricultural waste materials.

According to this invention, A method of making a non-polluting product comprising:

(a) grinding an agricultural fibrous material to form a particulate material;
(b) preparing a binder by mixing formaldehyde with carboxymethyl cellulose and polyvinylalcohol;
(c) mixing the particulate material with a stearate and a sulfate to form a first mixture;
(d) adding the binder and water to the first mixture to form a second mixture; and
(e) forming the second mixture into the non-polluting product.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

The present invention relates to a method of producing biodegradable, non-polluting products including containers, such as caskets, bone ash urns, food containers. The products are made by forming a composition which includes an agricultural fibrous particulate material, a binder and an additive to improve the water-resisting properties of the products.

The agricultural fibrous particulate material may be prepared by grinding an agricultural fibrous material and/or agricultural fibrous wastes. The agricultural fibrous wastes used in the present invention may be selected from the group consisting of plants' stems (e.g. rice stem, wheat stem, sorghum stem, etc), crop shells (e.g. rice shell, wheat shell, sorghum shell, etc.), residues of vegetables (e.g. residues of corncob, sugar canes, and beans), wood chips, and sawdust.

The additive is prepared by mixing a stearate and the sulfate. Preferably, the stearate is selected from a group consisting of magnesium stearate, calcium stearate, zinc stearate, aluminum stearate, and barium stearate. In addition, the sulfate is selected from a group consisting of barium sulfate, iron sulfate, zinc sulfate, manganese sulfate and chromium sulfate.

The binder is prepared by mixing formaldehyde with carboxymethyl cellulose and polyvinyl alcohol. Preferably, 75–85% by weight of formaldehyde is mixed with 5–15% by weight of carboxymethyl cellulose and 5–15% by weight of polyvinyl alcohol.

To produce the non-polluting product, it is preferable that 54–58% by weight of the particulate material is first mixed with 3–7% by weight of the stearate and 3–7% by weight of the sulfate. Then, 20–24% by weight of the binder and 10–14% by weight of water are added to the particulate material which has been mixed with the stearate and the sulfate. The resulting mixture is placed in a mold and formed under pressure and heat.

EXAMPLE

Stems of plants such as rice stems, wheat stems, sorghum stems were dried and ground to form a particulate material having a size of about 40–120 mesh. A binder was prepared by mixing 80% by weight of formaldehyde with 10% by weight of polyvinyl alcohol and 10% by weight of carboxymethyl cellulose. 56% by weight of the particulate material was mixed with 5% by weight of zinc stearate and 5% by weight of calcium sulfate. 22% by weight of the binder and 12% by weight of water were added to and mixed with the particulate material, zinc stearate and calcium sulfate to form a mixture. The mixing of the above components was carried out at ambient temperature. The temperature of the components under mixing was kept to be not higher than 50° C. The mixture was placed in a mold and was molded under high pressure and temperature (about 185–200° C.). The molded product was released from the mold, cooled and then air-dried. Finally, the molded product was coated with a paint.

Figure 1:
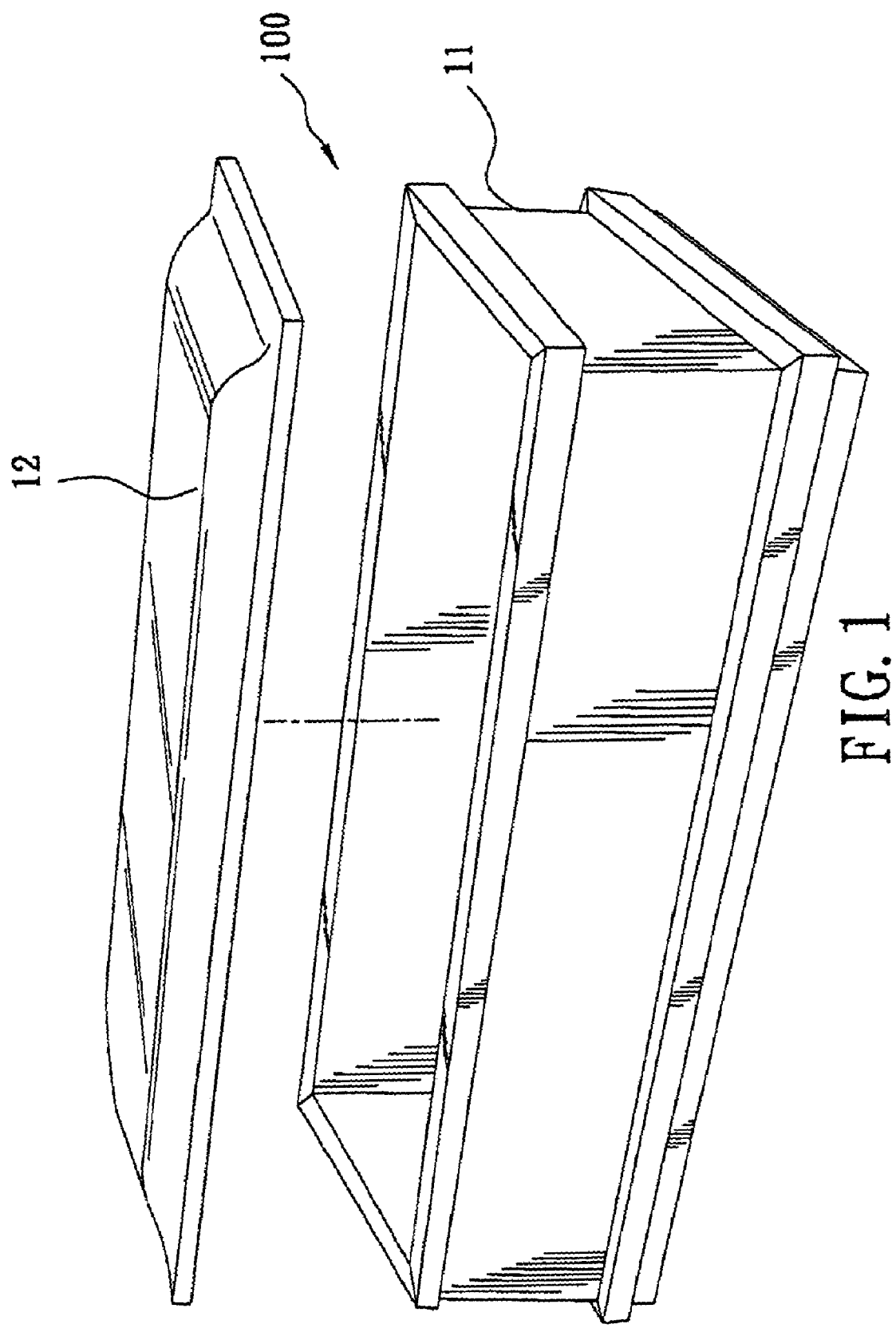
FIG. 1 is a perspective view of a casket product made according to the present invention.

Referring to FIG. 1, a casket 100 produced according to the method of the present invention includes a one-piece molded casket body 11 and a cover 12.

Figure 2:
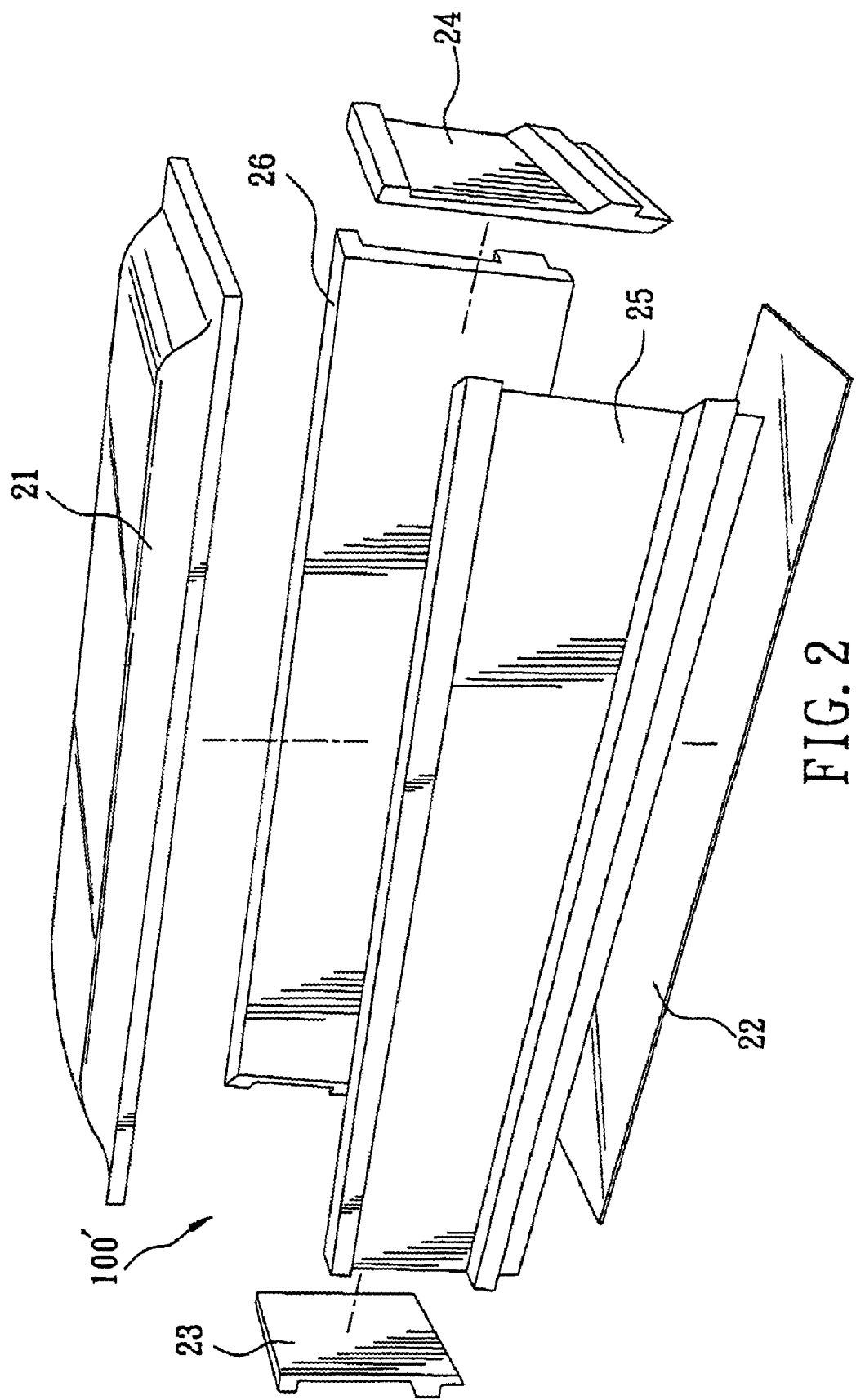
FIG. 2 is a perspective view showing another casket product made according to the present invention.

Referring to FIG. 2, a casket 100' is formed by assembling a top panel 21, a bottom panel 22, a front panel 23, a rear panel 24, a right panel 25, and a left panel 26, all of which are produced according to the method of the present invention. The aforesaid components may be assembled by adhesive bonding or by using fasteners, such as nails or screws.

Figure 3:
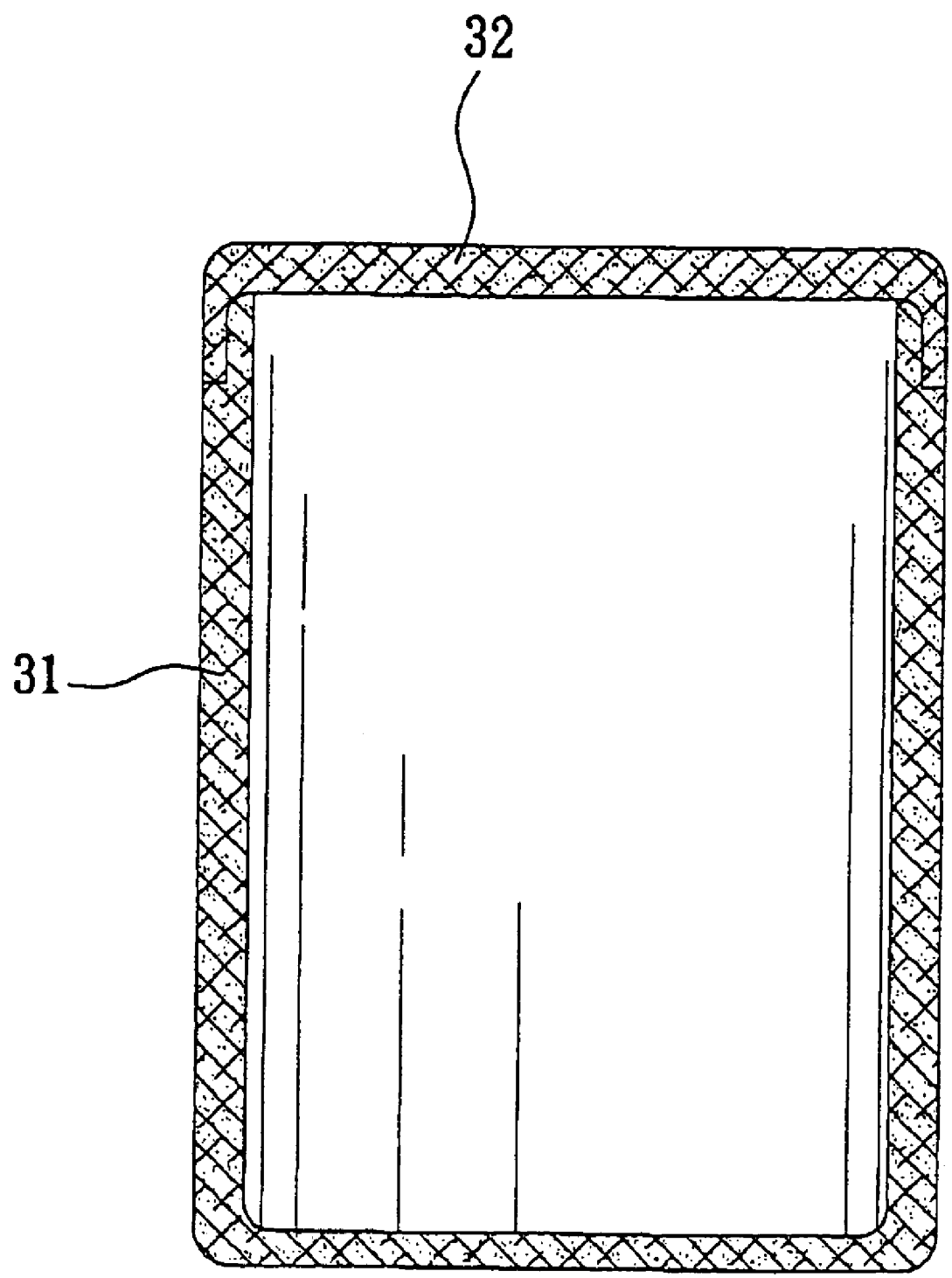
FIG. 3 is a side view showing a bone ash urn product made according to the present invention.

Referring to FIG. 3, the method of the present invention may be used to produce a bone ash urn 31 for containing bone ash, and a lid 32 for closing the open top of the bone ash urn 31.

The aforesaid method of the present invention provides the following advantages:
1. As a main raw material used in the present invention can be obtained easily from agricultural wastes, products can be produced at relatively low costs in the present invention. The agricultural wastes may be selected according to the seasons and sources available locally.
2. The products produced by the present invention can decompose naturally without leaving any polluting residue. In addition, the products can exhibit good hardness and do not involve any toxic or polluting substance harmful to environment.
3. After the products are buried in the soil, they can decompose into organic materials usable as a fertilizer.
4. As the present invention produces substitutes for wooden caskets that are usually made of hard woods, it not only saves the consumption of hard woods, but also offers low-cost caskets.
5. As agricultural wastes are used as a main raw material, aside from the benefit of waste recycling, environmental problems due to extensive felling of numerous trees are also avoided.
6. The casket made according to the present invention does not produce any polluting gas during cremation.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A method of making a non-polluting product comprising:
   (a) grinding an agricultural fibrous material into a particulate material;
   (b) preparing a binder by mixing formaldehyde with carboxymethyl cellulose and polyvinylalcohol;
   (c) mixing the particulate material with a stearate and a sulfate to form a first mixture;
   (d) adding the binder and water to the first mixture to form a second mixture; and
   (e) forming the second mixture into the non-polluting product.

2. The method as claimed in claim 1, wherein 75%–85% by weight of formaldehyde is mixed with 5–15% by weight of polyvinyl alcohol and 5–15% by weight of carboxymethyl cellulose.

3. The method as claimed in claim 2, wherein the percentages of the components contained in the second mixture is as follows:
   20–24% by weight of the binder;
   3–7% by weight the stearate;
   3–7% by weight of the sulfate;
   10–14% by weight of water; and
   54–58% by weight of the particulate material.

4. The method as claimed in claim 2, wherein the percentages of the components contained in the second mixture is as follows:
   22% by weight of the binder;
   5% by weight the stearate;
   5% by weight of the sulfate;
   12% by weight of water; and
   56% by weight of the particulate material.

5. The method as claimed in claim 1, wherein the agricultural fibrous material is an agricultural waste material which is selected from the group consisting of plants' stems, crop shells, residues of vegetables, wood shavings, and sawdust.

6. The method as claimed in claim 1, wherein the agricultural fibrous material is ground to a size of about 40–120 mesh.

7. The method as claimed in claim 1, wherein the stearate selected from a group consisting of magnesium stearate, calcium stearate, zinc stearate, aluminum stearate, and barium stearate.

8. The method as claimed in claim 7, wherein the sulfate is selected from a group consisting of barium sulfate, iron sulfate, zinc sulfate, manganese sulfate and chromium sulfate.

\* \* \* \* \*